United States Patent
Kim

(10) Patent No.: US 9,387,842 B2
(45) Date of Patent: Jul. 12, 2016

(54) CONTROL METHOD OF ELECTRO-MECHANICAL BRAKE

(71) Applicant: HYUNDAI MOBIS CO., LTD., Seoul (KR)

(72) Inventor: Do Kun Kim, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/723,385

(22) Filed: May 27, 2015

(65) Prior Publication Data

US 2016/0009260 A1    Jan. 14, 2016

(30) Foreign Application Priority Data

Jul. 9, 2014  (KR) .......................... 10-2014-0086222

(51) Int. Cl.
*B60T 8/171* (2006.01)
*B60T 8/176* (2006.01)
*B60T 8/88* (2006.01)
*B60T 13/74* (2006.01)

(52) U.S. Cl.
CPC .................. *B60T 8/171* (2013.01); *B60T 8/176* (2013.01); *B60T 8/885* (2013.01); *B60T 13/741* (2013.01); *B60T 2270/406* (2013.01)

(58) Field of Classification Search
CPC ......... B60T 8/171; B60T 8/176; B60T 8/885; B60T 13/741; B60T 2270/406
USPC .......................................................... 701/70
See application file for complete search history.

(56) References Cited

U.S. PATENT DOCUMENTS

| 2008/0224533 | A1* | 9/2008 | Nakada ................. B60T 8/4059 303/10 |
| 2015/0343874 | A1* | 12/2015 | Kurata ............... B60G 17/0195 701/29.1 |

FOREIGN PATENT DOCUMENTS

KR    10-2011-0026928 A    3/2011

* cited by examiner

*Primary Examiner* — Richard Camby

(57) ABSTRACT

Disclosed is a control method of an electro-mechanical brake, including: a first step of operating a brake to stop a vehicle and generating a target pressure value of the brake; a second step of calculating an electrical angle of a three-phase motor and preparing movement of the electrical angle when the vehicle stops; a third step of checking errors of requested current and pressure; a fourth step of setting a range of the electrical angle when the current and the pressure are normal; and a fifth step of forcibly moving an actual position of the electrical angle to an adjacent electrical angle.

12 Claims, 3 Drawing Sheets

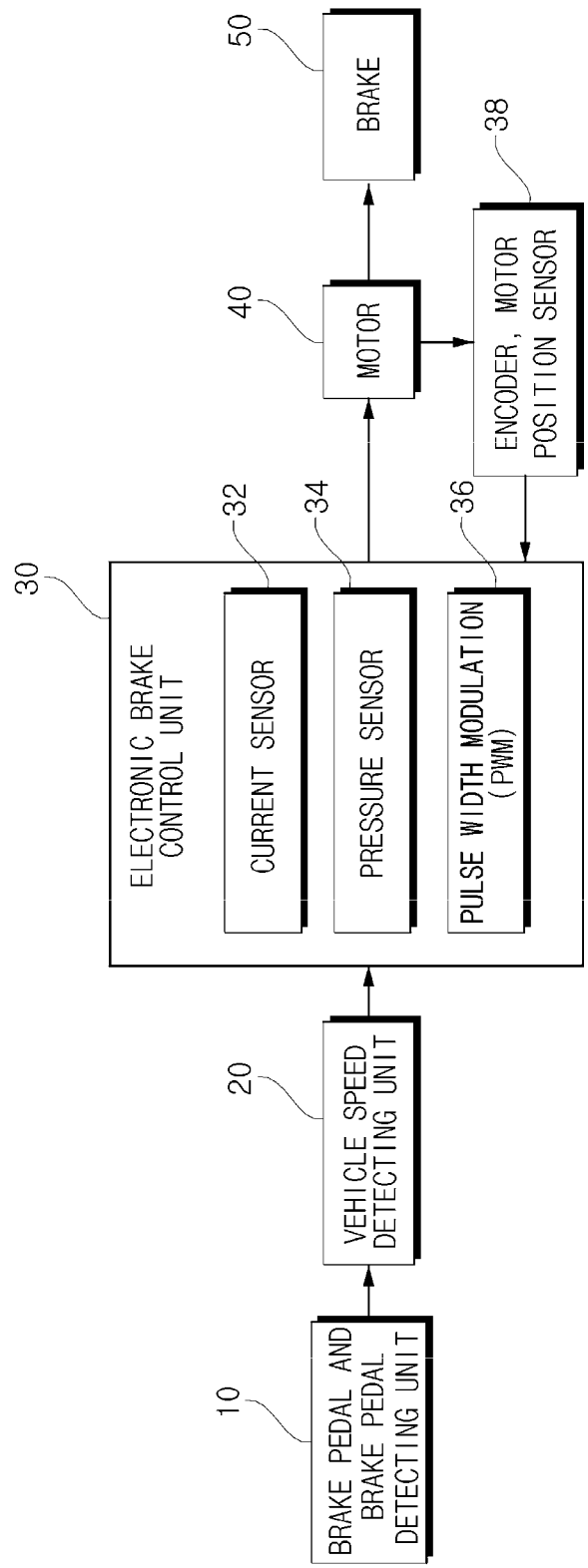

CONTROL METHOD OF ELECTRO-MECHANICAL BRAKE

CROSS-REFERENCE TO RELATED APPLICATIONS

This application claims priority to and the benefit of Korean Patent Application No. 10-2014-0086222 filed in the Korean Intellectual Property Office on Jul. 9, 2014, the entire contents of which are incorporated herein by reference.

TECHNICAL FIELD

The present invention relates to a control method of an electro-mechanical brake.

BACKGROUND ART

Generally, a brake of a vehicle puts a brake on a wheel by braking pressure formed when a driver operates a brake pedal to reduce a speed of the vehicle or maintain a stop state of the vehicle. However, when a general brake operates, there may occur a slip phenomenon in which the vehicle slips in accordance with a braking pressure or a condition of a road surface.

In order to solve the above-mentioned problem, in recent years, technologies for an anti-lock brake system (ABS), which electro-mechanically activates a braking pressure at the time of braking the vehicle to prevent wheels from locking up when the brake is pressed in a sudden stop while driving or under a bad condition of a road surface, and to maintain a steering torque, and an electronic stability control (ESC), in which several sensors, which is provided throughout the vehicle of which the brake operates, adjust the brake or an engine output by comparing a handling direction of the driver with an actual driving direction, thereby controlling a driving condition of the vehicle and securing stability, have been suggested.

The electro-mechanical brake of the related art increases a braking pressure when the vehicle stops, in order to satisfy related traffic regulations. Therefore, an amount of current which is consumed at the time of braking the vehicle is increased so that a three-phase motor and an electronic control unit (ECU) of the vehicle may be damaged or a life span or performance of parts may be lowered.

RELATED ART DOCUMENT

Korean Patent Application Laid-Open No. 10-2011-0026928 (filed on Sep. 9, 2009)

SUMMARY OF THE INVENTION

The present invention has been made in an effort to provide a control method of an electro-mechanical brake which when the electro-mechanical brake operates to stop the vehicle and an electrical angle of each phase of the three-phase motor is located at the maximum current point, forcibly moves the electrical angle to an adjacent electrical angle to distribute a maximum current which is concentrated at the electrical angle of each phase of the three-phase motor, thereby preventing the three-phase motor and an electronic control unit of the vehicle from being damaged by the maximum current which is concentrated at the electrical angle and improving the life span and the performance of the parts.

An exemplary embodiment of the present invention provides a control method of an electro-mechanical brake, including: a first step of operating a brake to stop a vehicle and generating a target pressure value of the brake; a second step of calculating an electrical angle of a three-phase motor and preparing movement of the electrical angle when the vehicle stops; a third step of checking errors of requested current and pressure; a fourth step of setting a range of the electrical angle when the current and the pressure are normal; and a fifth step of forcibly moving an actual position of the electrical angle to an adjacent electrical angle.

The brake target pressure value of the first step may be generated by an input signal of the brake and the vehicle, controlled by the maximum pressure of the brake (maximum torque condition of the three-phase motor) may be stopped.

In the second step, the electrical angle may be measured using a motor position sensor.

The second step may further include a step of setting a target current value and outputting a pulse width modulation, before performing the third step.

In the third step, the error of the current may be checked by checking whether a value obtained by subtracting an actual feedback current by a sensor input from a target current satisfies zero, and the error of the pressure may be checked by checking whether a value obtained by subtracting an actual feedback pressure by the sensor input from the target pressure satisfies zero.

In the fourth step, ranges of 30 to 90 degrees, 90 to 150 degrees, 150 to 210 degrees, 210 to 270 degrees, and 270 to 330 degrees, which are adjacent to 30 degrees, 90 degrees, 210 degrees, 270 degrees, and 330 degrees of the electric angle of each phase of the three-phase motor into which the maximum current flows, may be set.

In the fifth step, the adjacent electrical angle may be 60 degrees, 120 degrees, 180 degrees, 240 degrees, and 300 degrees.

In the fifth step, the electrical angle may be forcibly converted into an adjacent electrical angle to lower a consistent current amount of a field effect transistor by distributing the current which is concentrated onto each phase of the three-phase motor.

According to a control method of an electro-mechanical brake according to an exemplary embodiment of the present invention, when the electro-mechanical brake operates to stop the vehicle and an electrical angle of each phase of the three-phase motor is located at the maximum current point, it is possible to forcibly move the electrical angle to an adjacent electrical angle to distribute a maximum current which is concentrated at the electrical angle, thereby lowering a degree of fatigue of a field effect transistor (FET) to improve durability of the system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a block diagram of a configuration of FIG. 1.

Figure 1:
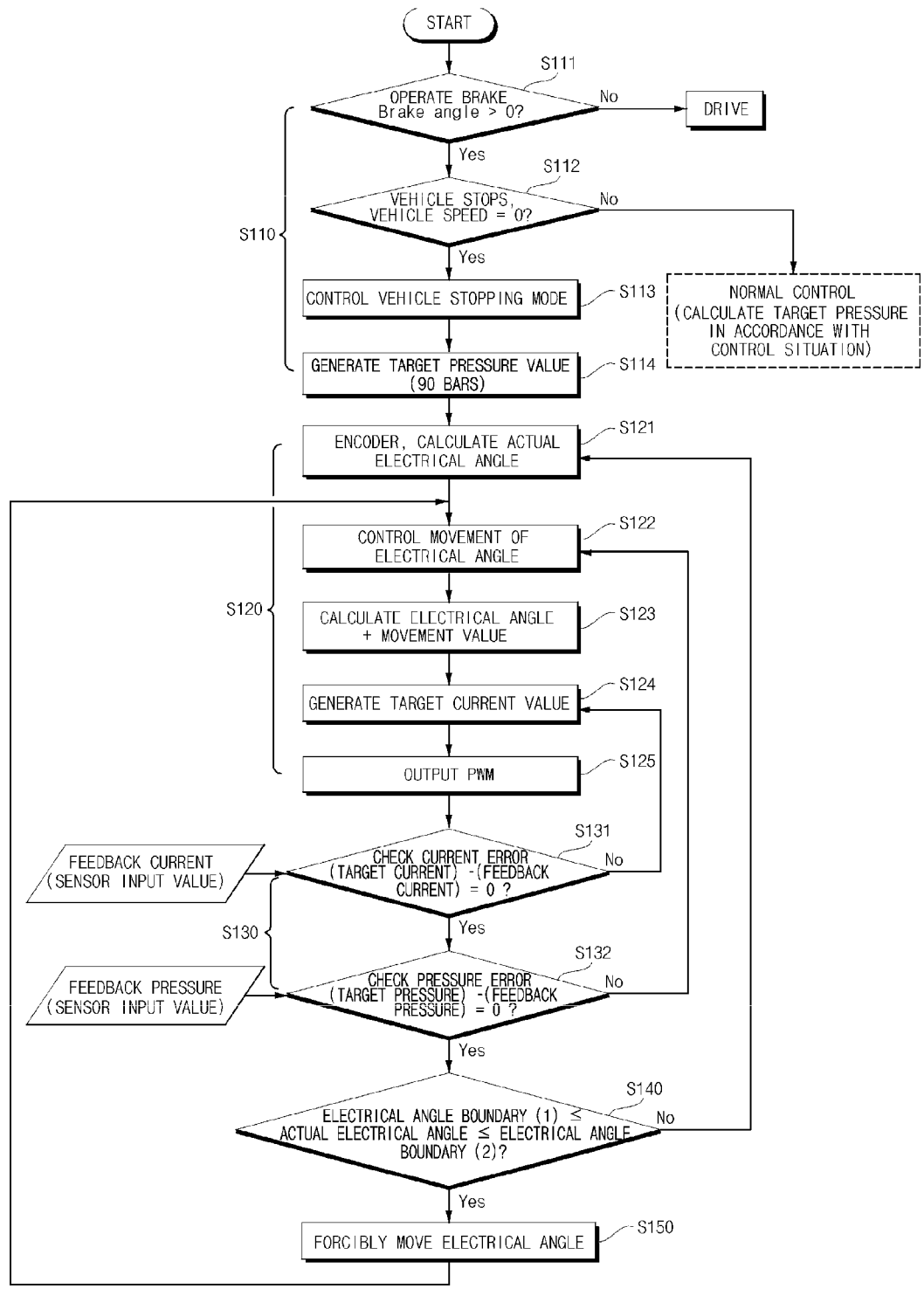
FIG. 1 is a flowchart of a control method of an electro-mechanical brake according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in denoting reference numerals to constituent elements of respective drawings, it should be noted that the same constituent elements will be designated by the same reference numerals even though they are shown in different drawings. In the description of the present invention, the detailed descriptions of publicly known related constitutions or functions thereof may be omitted if they make the gist of the present invention unclear. Hereinafter, an exemplary embodiment of the present invention will be described, but it is obvious that the technical spirit of the present invention is not restricted or limited thereto, but the exemplary embodiment of the present invention may be modified by a person with ordinary skill in the art and may be variously carried out.

A control method of an electro-mechanical brake according to an exemplary embodiment of the present invention may include a first step S110 of activating a brake to stop a vehicle and generating a target pressure value of the brake, a second step S120 of calculating an electrical angle of a three-phase motor and preparing movement of the electrical angle when the vehicle stops, a third step S130 of checking errors of a requested current and pressure, a fourth step S140 of setting a range of the electrical angle when the current and the pressure are normal, and a fifth step S150 of forcibly moving an actual position of the electrical angle to an adjacent electrical angle.

In the first step, when force is applied to a brake pedal 10 to activate a brake of a vehicle, a revolving angle of the brake 50 becomes larger than zero, and a brake operating step S111 in which a brake pedal detecting unit detects the revolving angle to activate the brake 50 is performed. After the brake operating step S111, a vehicle speed stopping step S112 in which a vehicle speed detecting unit 20 detects a vehicle speed and the vehicle speed is displayed on an instrument panel as zero is performed. In this case, after a stop mode control step S113 in which a stop mode is controlled, a target pressure value generating step S114 in which the brake pedal detecting unit detects a signal input to the brake 50 and a pressure sensor 34 of an electro-mechanical brake control unit 30 generates a target pressure value is performed. The target pressure value of the brake 50 in the first step is generated by an input signal (a pedal angle sensor) of the brake 50 and the target pressure value may be approximately 90 Bars or higher.

When the vehicle speed is not zero, the vehicle does not completely stop but is in a simple speed reducing status so that the brake 50 operates by a general control method.

When the force is continuously applied to the brake pedal 10 in a vehicle stop status in order to reach the target pressure value of the brake 50, maximum current flows in each phase of the three-phase motor 40. In this process, a degree of fatigue of a field effect transistor FET is increased due to the maximum current, which flows into each phase of the three-phase motor 40, so that the FET may be damaged, which may cause a fatal defect of the system. Therefore, it is required to distribute the maximum current of each phase of the three-phase motor 40. As a method thereof, an electrical angle of each phase of the three-phase motor into which the maximum current flows may be forcibly moved to an adjacent angle.

First, in the first step, when the vehicle completely stops, an actual electrical angle calculating step S121, in which the electrical angle of the three-phase motor 40 is measured using a motor position sensor (encoder) 28 at a time when the brake pedal 10 operates and the vehicle stops, is performed. The motor position sensor 38 is a digital position sensor and may measure a rotational angle displacement and a straight line displacement. When the brake pressure is correctly converged to the target pressure value generated in the first step and stabilized, the motor position sensor 38 may measure a value of the electrical angle at which the vehicle stops at one of angles of 0 to 360 degrees of each phase of the three-phase motor 40.

In order to generate an appropriate target current value, a step S123 of calculating an actual electrical angle and a movement value of a virtual electrical angle, which moves to an adjacent section, is performed after an electrical angle movement control step S122 which controls the movement of the electrical angle measured using the motor position sensor 38.

The second step S120 may further include a step S124 of generating a target current value and a step S125 of outputting pulse width modulation (PWM) 36 before performing the third step S130.

Figure 2:
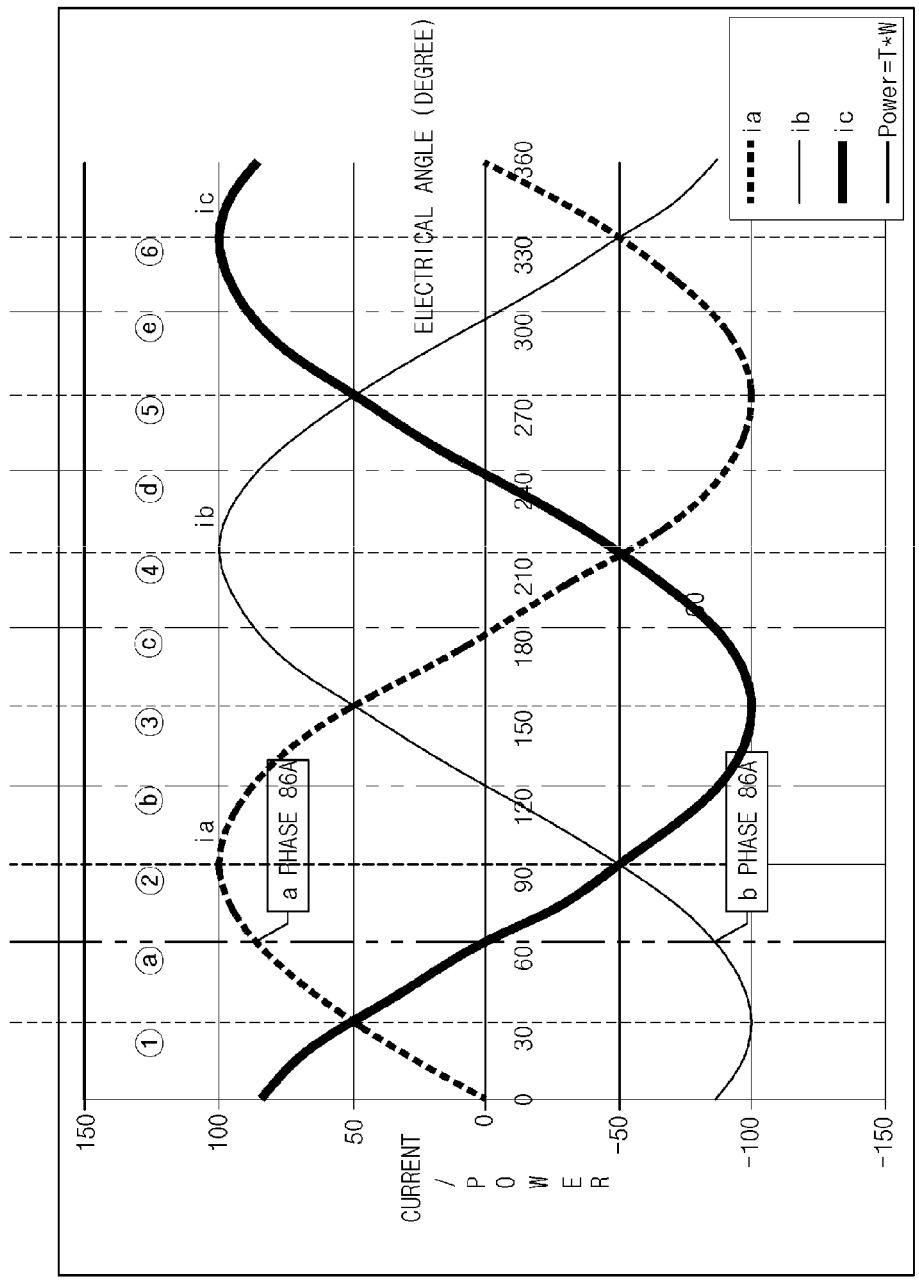
FIG. 2 is a graph of controlling an electrical angle of FIG. 1.

The PWM 36 improves the increase in current and makes a coil current be a constant current. The step S125 of outputting the PWM 36 may repeatedly supply or stop supplying the current with a time interval to reduce the current amount. While the current is stabilized through the PWM 36, a waveform of the current is determined, and the electrical angle as illustrated in FIG. 2 is obtained, so that step S125 needs to be performed before the third step S130.

In the third step S130, the error of the current is checked by a current error checking step S131 of checking whether a value obtained by subtracting an actual feedback current by the sensor input from the target current satisfies zero, and the error of the pressure may be checked by a pressure error checking step S132 of checking whether a value obtained by subtracting an actual feedback pressure by the sensor input from the target pressure satisfies zero. In the current error checking step S131, the feedback current may be measured by a current sensor 32 and in the pressure error checking step S132, the feedback pressure may be measured by a pressure sensor 34.

The current sensor 32 refers to a sensor which detects an alternative current and a direct current. As a method of detecting a current, there are a current transformer method which measures a secondary current using a magnetic core having a donut shape, which is wounded with primary and secondary coils, to detect the primary current, a hole element method which provides a hole element in a magnetic field generated by the current to measure a hole voltage and detect a strength of a magnetic field, that is, a strength of the current, and a fuse method in which a fusing time varies depending on the strength of the current.

The pressure sensor 34 may be a sensor which detects a pressure of liquid or gas and converts the detected pressure into an electric signal which is easily used for measurement or control.

Referring to FIG. 2, as understood from the graph, a predetermined torque and a predetermined current cycle may be checked through the current error checking step S131 and the pressure error checking step S132. Accordingly, according to the method of the exemplary embodiment of the present invention, there is no variable and criteria may be exactly selected so that the electrical angle may be moved.

In the fourth step S140, the electric angle of each phase of the three-phase motor 40 into which the maximum current flows may have ranges of 30 to 90 degrees, 90 to 150 degrees, 150 to 210 degrees, 210 to 270 degrees, and 270 to 330 degrees which are adjacent to 30 degrees, 90 degrees, 210 degrees, 270 degrees, and 330 degrees. When an actual electrical angle is located in any one of the ranges of 30 to 90 degrees, 90 to 150 degrees, 150 to 210 degrees, 210 to 270 degrees, and 270 to 330 degrees, the electrical angle may be forcibly moved. Since the stop range of the electrical angle is not constant, the range is determined and the electrical angle forcibly moves to an adjacent electrical angle in accordance with each range.

The adjacent electrical angle in the fifth step S150 may be 60 degrees, 120 degrees, 180 degrees, 240 degrees, and 300 degrees. A maximum current value in accordance with the adjacent angle is approximately 86 A (assuming that the highest current is 100 A) which is lower than other electrical angles whose maximum current value is 100 A. Therefore, an electrical angle which has a higher current value than a current value of approximately 86 A forcibly moves to an adjacent electrical angle. For example, referring to FIG. 2, when an electrical angle at the time of stopping the vehicle is 90 degrees, the electrical angle is located in the range of 30 to 90. In the case of is current, the current value is 100 A at an actual electrical angle of 90 degrees, and when the electrical angle moves to the adjacent electrical angle of 60 degrees, the current value is lowered to be approximately 80 A. Therefore, according to the method of the exemplary embodiment of the present invention, heat due to a high current is reduced and a degree of fatigue of the FET is lowered so that the system is stabilized and durability is increased.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A control method of an electro-mechanical brake, the method comprising:
    operating a brake of a vehicle and generating a target pressure value of the brake;
    generating a target current by measuring an electrical angle of a three-phase motor and preparing to move the electrical angle when the vehicle stops;
    generating a current error by subtracting an actual feedback current from the target current, and generating a pressure error by subtracting an actual feedback pressure from the target pressure;
    setting a range that includes the electrical angle when the current and the pressure errors are substantially equal to zero; and
    forcibly moving an actual position of the electrical angle to an adjacent electrical angle.

2. The control method of claim 1, wherein the target pressure is generated by an input signal of the brake, the target pressure being a pressure at which the vehicle may be stopped.

3. The control method of claim 1, wherein the electrical angle is measured using a motor position sensor.

4. The control method of claim 1, further comprising outputting a pulse width modulation, before generating the current error and the pressure error.

5. The control method of claim 1, wherein the range is one of 30 to 90 degrees, 90 to 150 degrees, 150 to 210 degrees, 210 to 270 degrees, and 270 to 330 degrees, and the adjacent electrical angle is one of 30 degrees, 90 degrees, 210 degrees, 270 degrees, and 330 degrees.

6. The control method of claim 1, wherein the adjacent electrical angle is one of 60 degrees, 120 degrees, 180 degrees, 240 degrees, and 300 degrees.

7. The control method of claim 1, wherein the electrical angle is forcibly converted to an adjacent electrical angle to lower a consistent current amount of a field effect transistor by distributing a current concentrated onto each phase of the three-phase motor.

8. A control method, comprising:
    activating a brake of a vehicle by activating a 3-phase motor of the brake;
    measuring an electrical angle for each phase of the 3-phase motor; and
    lowering a maximum current of each phase of the 3-phase motor by changing the electrical angle to an adjacent angle after the electrical angle has been measured.

9. The control method of claim 8, wherein the electrical angle is measured when an actual brake pressure is substantially equal to a target pressure, and an actual feedback current is substantially equal to a target current.

10. The control method of claim 8, further comprising:
    determining a range that includes the measured electrical angle,
    wherein the adjacent electrical angle is defined according to the determined range.

11. The control method of claim 10, wherein the range is one of 30 to 90 degrees, 90 to 150 degrees, 150 to 210 degrees, 210 to 270 degrees, and 270 to 330 degrees, and the adjacent electrical angle is one of 60 degrees, 120 degrees, 180 degrees, 240 degrees, and 300 degrees.

12. The control method of claim 8, further comprising:
    detecting a speed of the vehicle,
    wherein the electrical angle is changed when the detected speed is equal to zero.

* * * * *